US012082124B2

(12) United States Patent
Frank

(10) Patent No.: US 12,082,124 B2
(45) Date of Patent: Sep. 3, 2024

(54) METHOD AND APPARATUS FOR DYNAMIC POWER SHARING AND MANAGING THE MAXIMUM POWER FOR A SECONDARY CARRIER

(71) Applicant: Lenovo (Singapore) PTE. LTD., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 329 days.

(21) Appl. No.: 17/764,729

(22) PCT Filed: Oct. 5, 2020

(86) PCT No.: PCT/IB2020/059345
§ 371 (c)(1),
(2) Date: Mar. 29, 2022

(87) PCT Pub. No.: WO2021/064716
PCT Pub. Date: Apr. 8, 2021

(65) Prior Publication Data
US 2022/0377677 A1 Nov. 24, 2022

Related U.S. Application Data

(60) Provisional application No. 62/911,142, filed on Oct. 4, 2019, provisional application No. 62/914,824, filed on Oct. 14, 2019.

(51) Int. Cl.
*H04W 52/34* (2009.01)
*H04W 52/24* (2009.01)
(Continued)

(52) U.S. Cl.
CPC ........ *H04W 52/346* (2013.01); *H04W 52/24* (2013.01); *H04W 52/365* (2013.01);
(Continued)

(58) Field of Classification Search
None
See application file for complete search history.

(56) References Cited

U.S. PATENT DOCUMENTS 9,706,593 B2 * 7/2017 Park ............... H04W 72/21
9,826,489 B2 * 11/2017 Park ............... H04W 28/0215
(Continued)

OTHER PUBLICATIONS

3GPP, "Correction on PHR in EN-DC/NE-DC/NR-CA", Huawei, HiSilicon 3GPP TSG-RAN WG1 Meeting #98, R1-1909837 Aug. 26-30, 2019, pp. 1-4.
(Continued)

*Primary Examiner* — Pablo N Tran
(74) *Attorney, Agent, or Firm* — Kunzler Bean & Adamson

(57) ABSTRACT

Managing use of dynamic power sharing for dual carrier operation is provided. A power head room report is received (902) from the master cell group. An allowed tolerance is identified (904) from the received power head room report, which includes a maximum expected possible deviation between a power level at which the user equipment requests that a communication be set and an actual power level at which the corresponding communication is transmitted. A lower bound of a maximum configured power of the secondary cell group is determined (906), which enables the user equipment to meet emission requirements during the dual carrier operation, as well as the total power constraints, while accounting for the allowed tolerance identified. The
(Continued)

lower bound of the maximum configured power for the carrier of the secondary cell group is set (908) at the determined level.

19 Claims, 8 Drawing Sheets

(51) Int. Cl.
    *H04W 52/36*     (2009.01)
    *H04W 72/02*     (2009.01)
    *H04W 72/04*     (2023.01)
    *H04W 76/16*     (2018.01)
    *H04W 88/06*     (2009.01)

(52) U.S. Cl.
    CPC ......... *H04W 52/367* (2013.01); *H04W 76/16* (2018.02); *H04W 88/06* (2013.01)

(56) References Cited

U.S. PATENT DOCUMENTS

| | | | | |
|---|---|---|---|---|
| 9,838,982 | B2* | 12/2017 | Yi | H04W 52/281 |
| 11,757,483 | B2* | 9/2023 | Zhou | H04W 72/21 |
| | | | | 370/252 |
| 2016/0302209 | A1* | 10/2016 | Behravan | H04W 72/541 |
| 2020/0288412 | A1* | 9/2020 | Ajdakple | H04W 52/42 |
| 2021/0045070 | A1* | 2/2021 | Yi | H04W 52/365 |
| 2022/0346034 | A1* | 10/2022 | Frank | H04W 52/365 |
| 2023/0189315 | A1* | 6/2023 | Haustein | H04W 24/02 |
| | | | | 370/252 |
| 2023/0189382 | A1* | 6/2023 | Haustein | H04W 76/20 |
| | | | | 370/329 |

OTHER PUBLICATIONS

3GPP, "Further Discussion of SCG MPR/A-MPR and PCMAX for EN-DC with Dynamic Power Sharing", Motorola Mobility 3GPP TSG-RAN WG4 Meeting #91, R4-1906957, May 13-17, 2019, pp. 1-25.

3GPP, "On the Lack of a Dynamic Power Sharing Requirement in TS 38.101-3", Motorola Mobility 3GPP TSG-RAN WG4 Meeting #92, R4-1909975, Aug. 26-30, 2019, pp. 1-30.

3GPP, "Additional Requirements Needed for Dynamic Power Sharing", Motorola Mobility 3GPP TSG-RAN WG4 Meeting #92bis, R4-1912543, Oct. 14-18, 2019, pp. 1-9.

3GPP, "Configured output power for inter-band NE-DC", Intel Corporation 3GPP TSG-RAN WG4 Meeting #90Bis, R4-1902920, Apr. 8-12, 2019, pp. 1-6.

3GPP, "On the SCG MPR/A-MPR and Pcmax for EN-DC with Dynamic Power Sharing", Motorola Mobility 3GPP TSG-RAN WG4 Meeting #90bis, R4-1904676, Apr. 8-12, 2019, pp. 1-18.

* cited by examiner

| CASE | SCENARIO | OBSERVATION | DYNAMIC POWER SHARING REQUIRED? |
|---|---|---|---|
| DC_(n)71AA | $P_{LTE} = P_{NR} = P_{ENDC} = 23$ dBm | UE CAN DROP SCG WHENEVER THERE IS AN MCG TRANSMISSION | NO: UE CAN DROP SCG EVEN WHEN POWER IS AVAILABLE AND NO SCALING IS REQUIRED |
| GENERAL INTRA-BAND NON-CONTIGUOUS | $P_{LTE} = P_{NR} = P_{ENDC} = 23$ dBm | UE CAN DROP SCG WHENEVER THERE IS AN MCG TRANSMISSION | NO: UE CAN DROP SCG EVEN WHEN POWER IS AVAILABLE AND NO SCALING IS REQUIRED |
| GENERAL INTRA-BAND CONTIGUOUS | $P_{LTE} = P_{NR} = P_{ENDC} = 23$ dBm MCG MODULATION ORDER IS 64-QAM OR LESS | UE CAN DROP SCG WHENEVER THERE IS AN MCG TRANSMISSION | NO: UE CAN DROP SCG EVEN WHEN POWER IS AVAILABLE AND NO SCALING IS REQUIRED |
| GENERAL INTER-BAND | $P_{LTE} = P_{NR} = P_{ENDC} = 23$ dBm BOTH MCG AND SCG MODULATION ORDER IS 64-QAM OR LESS | UE CAN SCALE SCG BY X_SCALE WHENEVER THERE IS AN MCG TRANSMISSION | NO: UE CAN SCALE SCG EVEN WHEN POWER IS AVAILABLE AND NO SCALING IS REQUIRED |
| | $P_{LTE} = P_{NR} = P_{ENDC} = 23$ dBm MCG MPR = 0 dB | UE CAN DROP SCG WHENEVER THERE IS AN MCG TRANSMISSION | NO: UE CAN DROP SCG EVEN WHEN POWER IS AVAILABLE AND NO SCALING IS REQUIRED |

FIG. 2

METHOD AND APPARATUS FOR DYNAMIC POWER SHARING AND MANAGING THE MAXIMUM POWER FOR A SECONDARY CARRIER

FIELD OF THE INVENTION

The present disclosure is directed to dynamic power sharing and managing the maximum power for a secondary carrier, including dynamic power sharing for dual carrier operation that determines a level of a lower bound of a maximum configured power of a secondary cell group.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment.

Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

In order to support greater data throughputs, service providers have been increasingly looking at techniques which extend the available bandwidth that is allowed to be used by a particular user within the system. At least a couple of bandwidth extending techniques include the use of carrier aggregation, dual carrier, and/or dual connectivity, where multiple frequency bands from one or more networks are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, including spectrum allocations alternatively associated with different standards and/or radio access technologies, which can also be used to support the ability of enhanced and/or more robust data throughput.

Such a possibility might better support the beginning stages of a build out of a network that incorporates the initial adoption for a particular standard, where area coverage for the emerging standard at least initially may be less than complete. During such a period of transition, it may be beneficial to better support the transition to an emerging standard by allowing bearers for the new standard to be supported in conjunction with the infrastructure of the more mature or previously established standard, and/or to supplement coverage of the emerging standard with coexisting communications using the more established standard.

In at least some instances, the network infrastructure supporting each of the standards may be alternatively referred to as a cell group. In some of these instances, one cell group may be prioritized over the other cell group. In such an instance, the prioritized cell group may be referred to as a master cell group and a non-prioritized cell group may be referred to as a secondary cell group.

In instances, where there are multiple connections, where in some instance the separate connections may involve a connection with a different network infrastructure, managing the overall operation of the communication connections in a particular user equipment relative to the potentially multiple networks can present a challenge, as some of the decisions may need to made in an environment where each of the actors may have less than complete information.

The present inventor has recognized that existing specifications may be overly conservative in terms of when a user equipment is allowed to not transmit or scale the power used in association with the secondary cell group, where it is reasonable for the secondary cell group to know the intended configured power for the master cell group, and which can take into account an allowed tolerance identified relative to a particular communication with the master cell group, which in turn can be used as part of the decision process as to whether to require the user equipment to transmit or not transmit in the secondary cell group, as well as the respective power level.

SUMMARY

The present application provides a method in a user equipment for managing use of dynamic power sharing for dual carrier operation, which includes respective communications via a master cell group and a secondary cell group. A power head room report is received from the master cell group. An allowed tolerance is identified from the received power head room report, which includes a maximum expected possible deviation between a power level at which the user equipment requests that a communication via the master cell group be set and an actual power level at which the corresponding communication via the master cell group is transmitted. A level of a lower bound of a maximum configured power of the secondary cell group is determined, which enables the user equipment to meet emission requirements during the dual carrier operation for communications via each of the master cell group and the secondary cell group, as well as the total power constraints for any overall communications of the user equipment, while accounting for the allowed tolerance identified relative to any communication via the master cell group. The lower bound of the maximum configured power for the carrier of the secondary cell group is set at the determined level.

According to another possible embodiment, a user equipment for managing use of dynamic power sharing for dual carrier operation, which includes respective communications via a master cell group and a secondary cell group is provided. The user equipment includes a transceiver that receives a power head room report from the master cell group. The user equipment further includes a controller, coupled to the transceiver, that identifies an allowed tolerance from the received power head room report, which includes a maximum expected possible deviation between a power level at which the user equipment requests that a communication via the master cell group be set and an actual power level at which the corresponding communication via the master cell group is transmitted. The controller further determines a level of a lower bound of a maximum configured power of the secondary cell group, which enables the user equipment to meet emission requirements during the dual carrier operation for communications via each of the master cell group and the secondary cell group, as well as the total power constraints for any overall communications of the user equipment, while accounting for the allowed tolerance identified relative to any communication via the master cell group. The controller further sets the lower bound of the maximum configured power for the carrier of the secondary cell group at the determined level These and other objects, features, and advantages of the present application are evident from the following description of one or more preferred embodiments, with reference to the accompanying drawings.

BRIEF DESCRIPTION OF THE DRAWINGS

FIG. 2 is a table, which provides a summary of allowed scaling/dropping behavior for E-UTRA-NR dual carrier with dynamic power sharing;

DETAILED DESCRIPTION OF THE PREFERRED EMBODIMENT(S)

Figure 1:
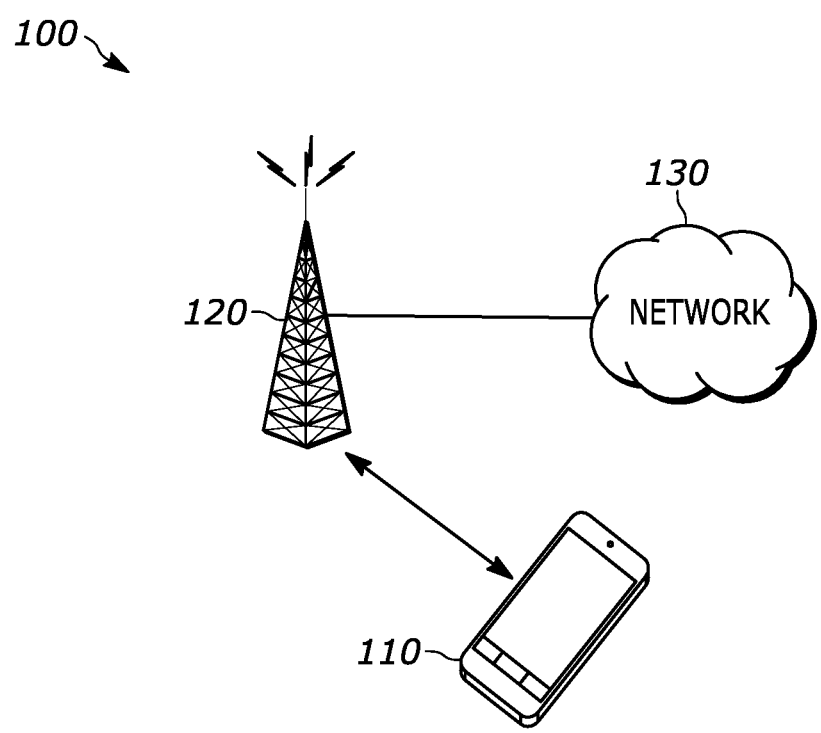
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide for managing the use of dynamic power sharing related to dual carrier operation.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

As has been previously noted, the technical specification (TS) 38.101-3 for the 3rd Generation Partnership Project Group Radio Access Network, entitled "NR; User Equipment (UE) radio transmission and reception; Part 3: Range 1 and Range 2 Interworking operation with other radios", does not require the dynamic power sharing UE to implement dynamic power sharing in the sense defined in technical specification (TS) 38.213 for the 3rd Generation Partnership Project Group Radio Access Network, entitled "NR; Physical layer procedures for control". In particular, the UE is always allowed to assume that the master cell group (MCG) for long term evolution (LTE) is transmitting at its stand-alone maximum power $P_{CMAX, E-UTRA}$ when determining if the secondary cell group (SCG) should be scaled or dropped, regardless of the actual power transmitted on the MCG. As a consequence of this definition, the dynamic power sharing UE is not required to implement dynamic power sharing in the sense that there is no requirement that the power not used by the MCG be made available to the SCG.

The scaling and dropping conditions in TS 38.101-3 depend on conditions 'a' and 'b' which are defined as the following:

$$a = 10 \log_{10}[p_{CMAX\_E-UTRA,c}(p) + p_{CMAX,f,c,NR}(q)] P_{EN-DC,tot\_L}; \text{ and}$$

$$b = 10 \log_{10}[p_{CMAX\_E-UTRA,c}(P) + p_{CMAX,f,c,NR}(q)/X\_scale] > P_{EN-DC,tot\_L}.$$

where the UE is allowed to drop the NR carrier if 'b' is true and the UE is allowed to scale $p_{CMAX,f,c,NR}$ by X_scale if 'a' is TRUE and 'b' is FALSE. As previously noted, current requirements in TS 38.101-3 have several negative consequences, including the following:

i) For multiple realistic deployment scenarios, the condition 'b' is always TRUE and the dynamic power sharing UE is allowed to drop the SCG carrier whenever there is an MCG transmission.

ii) For deployment scenarios for which condition 'a' is TRUE and condition 'b' is FALSE, the UE is allowed to scale the SCG even when no scaling is needed to meet either emissions or total power constraints.

iii) There is no requirement that that power not used by the MCG be made available to the SCG. Thus, the specification allows dynamic power sharing, but does not require it.

Fundamentally, in order to require the UE to implement dynamic power sharing in the sense described in TS 38.213, $P_{CMAX\_L}$ for the SCG must be a function of the actual MCG power $\hat{P}_{MCG}$. Concerns were expressed about the feasibility and testability of such a requirement due to the fact that $\hat{P}_{MCG}$ is not known precisely to the UE due to absolute power tolerances. In the present filing, we address these concerns and consider alternative proposals for defining a dynamic power sharing requirement which allows the UE to make power not used by the LTE carrier available to the NR carrier.

Bad Behavior Allowed with the SCG Scaling/Dropping Conditions in TS 38.101-3

The scaling and dropping rules in TS 38.101-3 have been studied for a variety of intra-band and inter-band EN-DC scenarios, and the results are provided in FIG. 2. More specifically, FIG. 2 illustrates a table 200, which provides a summary of allowed scaling/dropping behavior for E-UTRA-NR dual carrier with dynamic power sharing.

From the table illustrated in FIG. 2, we have the following four observations:

Observation 1: For DC_(n)71AA, the UE is always allowed to drop the SCG transmission when there is an MCG transmission, and this is true regardless of the RB allocations, the modulations, the value of X_scale, and the actual transmission power on the MCG, $\hat{P}_{MCG}$.

Observation 2: For the general intra-band non-contiguous EN-DC scenario in Table 1, the UE is always allowed to drop the SCG transmission when there is an MCG transmission, regardless of the RB allocations, the modulations, the value of X_scale, and the actual transmission power on the MCG, $\hat{P}_{MCG}$.

Observation 3: For the general intra-band contiguous EN-DC scenario in Table 1, if the modulation for the MCG is 64-QAM or less, the UE is always allowed to drop the SCG transmission when there is an MCG transmission, and this is true regardless of the RB allocations, the value of X_scale, and the actual transmission power on the MCG, $\hat{P}_{MCG}$.

Observation 4: For the general inter-band EN-DC scenario in Table 1, if the order of the modulation for both the MCG and SCG is 64-QAM or less, the UE is always allowed to scale the SCG transmission when there is an MCG transmission, and this is true regardless of the RB allocations, the value of X_scale, and the actual transmission power on the MCG, $\hat{P}_{MCG}$.

We now consider some more detailed examples illustrating the difference between the RAN1 requirement in TS 38.213 and the behavior that is allowed in TS 38.101-3.

Example 1: General Inter-Band EN-DC Without Network Signaling (NS)

We consider the general inter-band case without NS signaling from FIG. 2 in which $P_{LTE}=P_{NR}=P_{ENDC}=23$ dBm. Depending on the maximum power reduction (MPR) taken on each of the carriers, any of the following conditions is possible.

Figure 3:
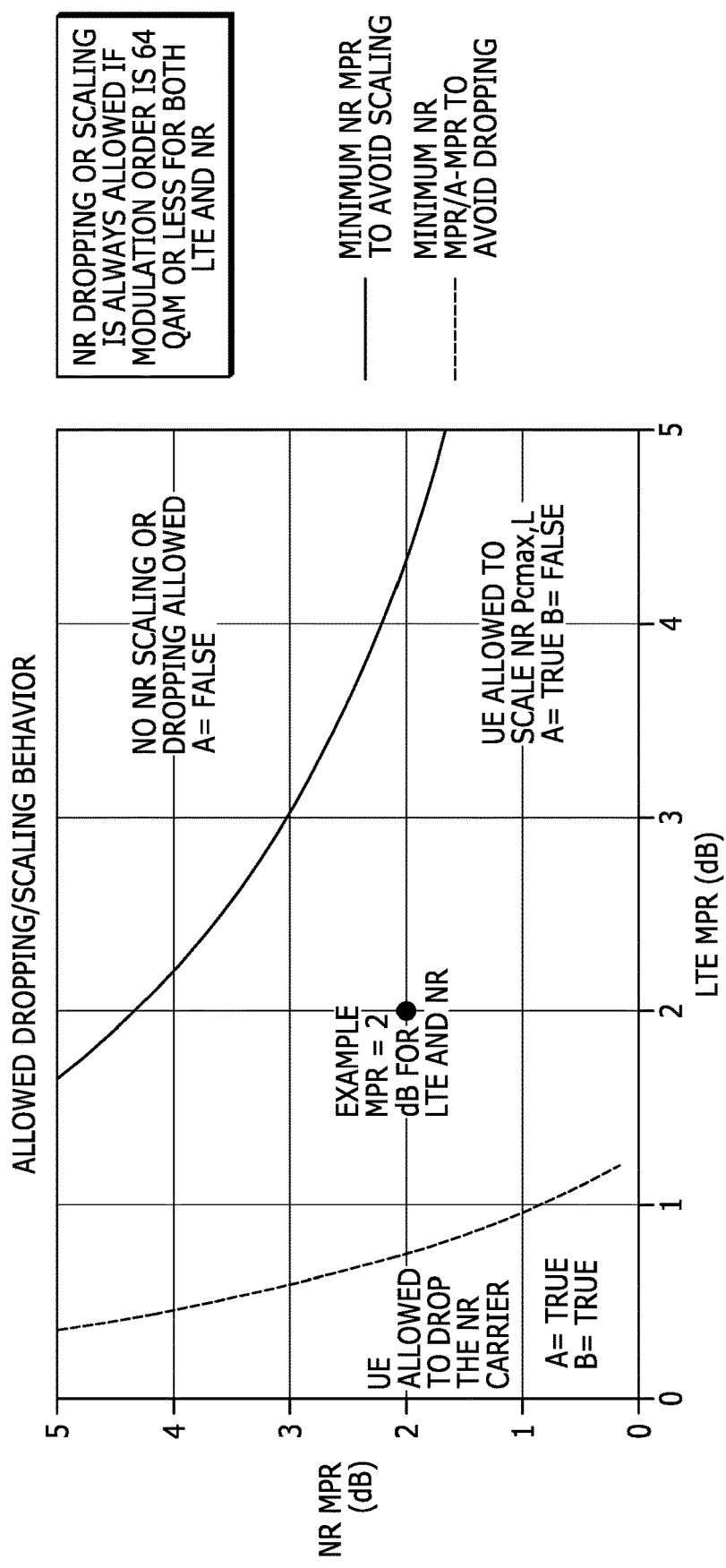
FIG. 3 is a graph, which illustrates allowed scaling and dropping behavior for general inter-band E-UTRA-NR dual carrier.

$a$=FALSE no scaling or dropping of the SCG is allowed $a$=TRUE, $b$=FALSE SCG scaling allowed $a$=TRUE, $b$=TRUE SCG dropping always allowed The different regions are marked in FIG. 3. More particularly, FIG. 3 is a graph 300, which illustrates allowed scaling and dropping behavior for general inter-band E-UTRA-NR dual carrier. It should be noted that these regions depend on the MPR (which depends on the modulation type and the allocation size and location) but are independent of the actual transmission powers $\hat{P}_{MCG}$ and $\hat{P}_{SCG}$. From FIG. 3, it can be observed that the UE is always allowed to scale or drop the NR carrier if the modulation order on both carriers is less than or equal to 64-QAM (quadrature amplitude modulation) (for which the MPR=3 dB) even if no scaling is needed to meet either emissions or total power constraints. The UE is only required to transmit the NR carrier without scaling in the region above the blue line, and in this region either the LTE carrier or the NR carrier must be transmitting 256-QAM so that the allowed MPR on at least one of the two carriers is greater than 3 dB.

We now consider the allowed behavior of the UE in the case that the MPR on both the LTE and NR carriers is equal to 2 dB. For this case, the sum of $P_{cmax,L}$ for the LTE and NR carriers is given by $$10 \log_{10}(10^{(23-2)/10}+10^{(23-2)/10})=24 \text{ dBm}$$

so that condition 'a' is TRUE. If we assume that X_scale is 6 dB, then we have $$10 \log_{10}(10^{(23-2)/10}+10^{(23-2-6)/10})=22 \text{ dBm},$$

so that the condition 'b' is FALSE. As a result, the UE is required to transmit the NR carrier but is allowed to set $P_{CMAX\_L}$ for the NR carrier equal to 15 dBm, no matter how little power is transmitted on the LTE carrier. For example, if the LTE carrier is only transmitting 13 dBm, the NR carrier is only required to transmit a maximum of 15 dBm even though it could transmit as much as 21 dBm and still meet both emissions and total power constraints.

Figure 4:
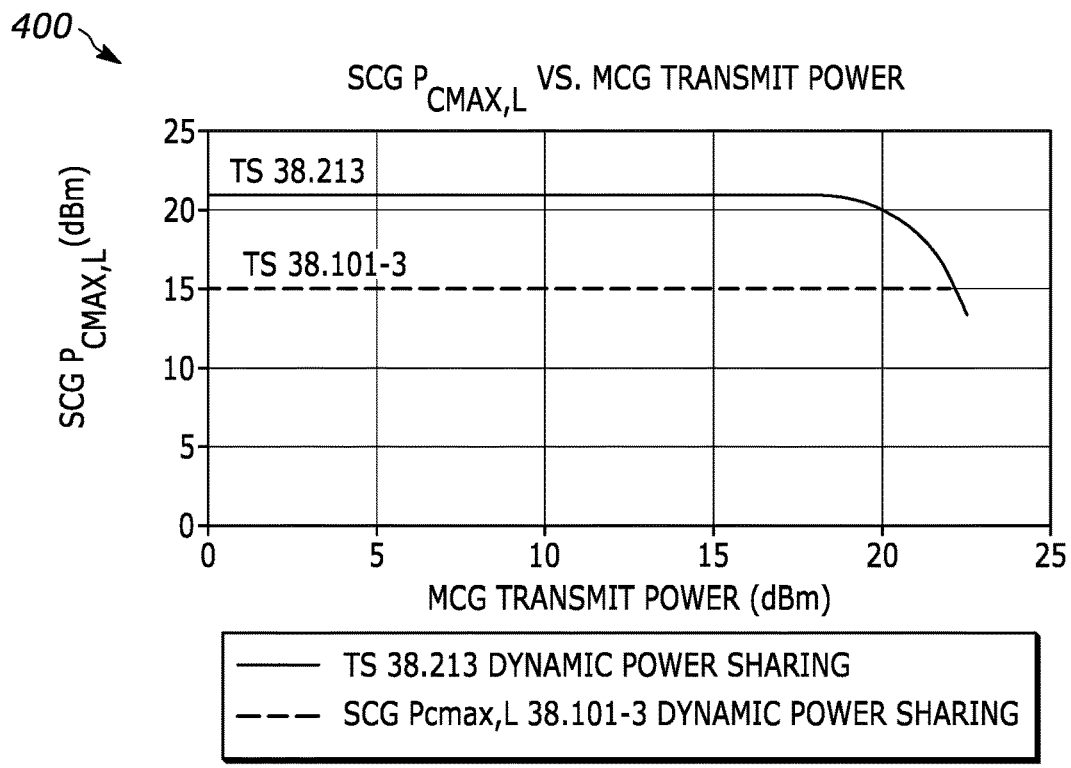
FIG. 4 is a graph, which illustrates allowed behavior in technical specification 38.101-3 versus dynamic power sharing behavior in technical specification 38.213, when maximum power reduction equals 2 dB for both the LTE and NR carriers.

This problem is illustrated in FIG. 4 in which it can be seen that $P_{CMAX\_L}$ for the NR carrier is 6 dB less than it would be with dynamic power sharing as described in TS 38.213. More specifically, FIG. 4 is a graph, which illustrates allowed behavior in technical specification 38.101-3 versus dynamic power sharing behavior in technical specification 38.213, when maximum power reduction equals 2 dB for both the LTE and NR carriers. From this example, it should be clear that even though the UE must transmit the NR carrier when a=TRUE and b=FALSE, dynamic power sharing is not required since the UE is never required to transmit more than 15 dBm on the NR carrier. It is thus possible for a UE which indicates support of dynamic power sharing to meet the requirements in TS 38.101-3 without requiring the UE to share power not used by the LTE carrier with the NR carrier.

Example 2: DC_(n)71AA

We next consider the example of DC_(n)71AA from FIG. 2 for the scenario in which $P_{LTE}=P_{NR}=P_{ENDC}=23$ dBm. As noted in the table 200 of FIG. 2, for this example the UE is always allowed to drop the NR carrier whenever there is a transmission on the LTE carrier. Thus, $P_{CMAX\_L}$ for the NR carrier is essentially 0 in linear terms, as is illustrated in the FIG. 5, no matter how little power $\hat{P}_{MCG}$ is transmitted on the MCG. More specifically, FIG. 5 is a graph 500, which illustrates allowed behavior in technical specification 38.101-3 versus dynamic power sharing behavior in technical specification 38.213 for a full resource block allocation.

While TS 38.101-3 always allows the UE to drop the NR carrier, there is significant power that could be transmitted on the NR carrier while still meeting both emissions and total power constraints. In FIG. 5, the power that could be transmitted is shown as a function $\hat{P}_{MCG}$ for a full allocation for which the total additional maximum power reduction (A-MPR) is 6.5 dB for cyclic prefix orthogonal frequency division multiplexing (CP-OFDM). The second curve corresponds to $P_{cmax,L}$ previously proposed and is consistent with the dynamic power sharing requirements in TS 38.213.

Verification of Dynamic Power Sharing

Figure 5:
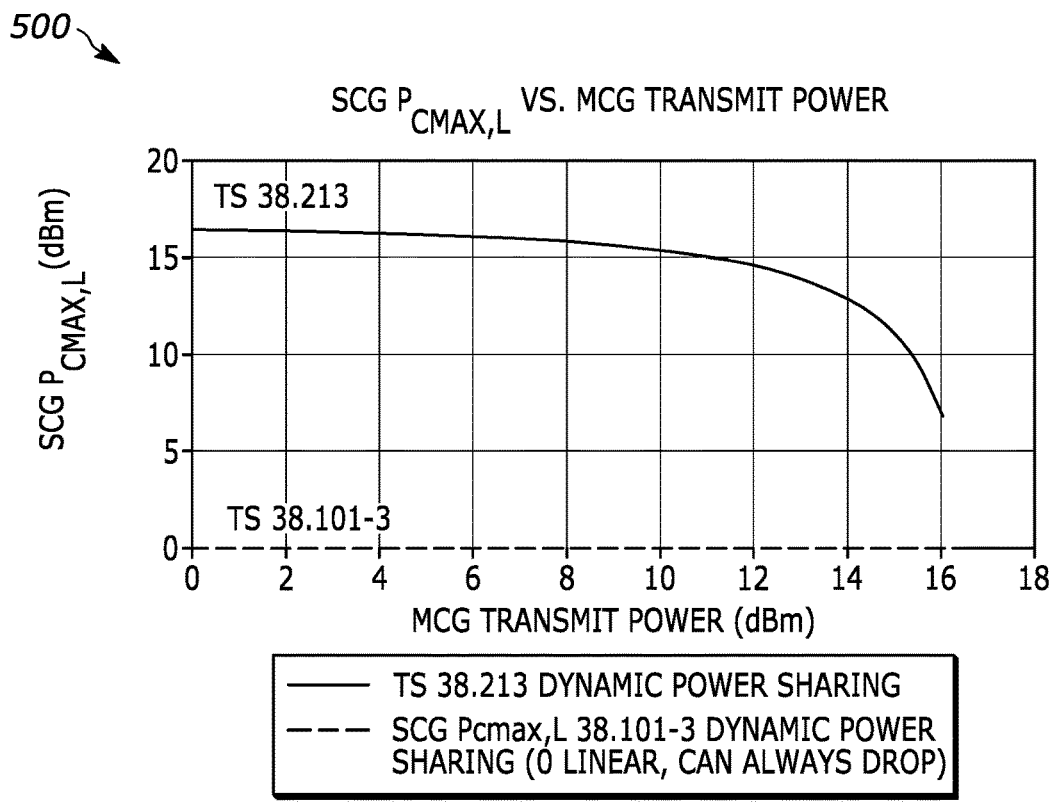
FIG. 5 is a graph, which illustrates allowed behavior in technical specification 38.101-3 versus dynamic power sharing behavior in technical specification 38.213 for a full resource block allocation.

Multiple previous contributions have suggested that the problems identified in the table 200 of FIG. 2 and illustrated in the graphs of FIGS. 3-5 can be resolved by modifying the parameters $P_{LTE}$, $P_{NR}$, and $P_{ENDC}$ so that dropping can be avoided by ensuring the condition 'b' is FALSE, and scaling can be avoided by ensuring condition 'a' is FALSE. However, this approach does not resolve the issue, since if condition 'a' is FALSE, no dynamic power sharing is needed at all (and thus it is not tested), and if condition 'b' is FALSE, the UE may still scale the $P_{cmax}$ for the NR carrier by X_scale even when no scaling is needed as is indicated in Example 1 above. Fundamentally, dynamic power sharing cannot be tested when the LTE carrier is at maximum power because dynamic power sharing is the requirement that the UE share power that is not needed by the LTE carrier with the NR carrier.

As has been previously discussed, two types of test requirements can be considered for dynamic power sharing:

i) A qualitative requirement in which the measured NR transmit power must increase as the measured LTE power decreases. For this requirement, the UE is given power 'up' commands for both the LTE and NR carriers until the output power reaches steady state. The power is measured for both the LTE and NR carriers. The UE is then given several "down" power control commands for LTE after which it is given continuous "up" power control commands for NR. After the NR power reaches steady state, the measured NR power is recorded. As the LTE power is reduced with each set of "down" power control commands on the LTE carrier followed by "up" power commands for the NR carrier, the measured NR power must increase in order to meet the qualitative requirement.

ii) A quantitative requirement in which the measured NR power is compared to a modified $P_{CMAX,L}$ for the NR carrier. For this requirement, $P_{CMAX,L}$ for the NR carrier is determined from a measurement of $\hat{P}_{MCG}$ for the LTE carrier. The UE is given continuous "up" power control commands for the NR carrier until the NR output power reaches steady state. The measured NR power must then be greater than the modified $P_{CMAX,L}$ for the NR carrier in order to meet the quantitative requirement.

A qualitative test can be used without any change of the $P_{cmax,L}$ definition for the NR carrier as it is only checking the desired general behavior that as less power is transmitted over the LTE carrier, more power is made available to the NR carrier. Conversely, a quantitative test requires a value of $P_{cmax,L}$ for the NR carrier that is a function of the LTE power so for a test requirement, we propose the following.

Intra-Band EN-DC

For intra-band EN-DC when condition 'a' is TRUE, let $\check{P}_{MCG}$ denote the configured power for the LTE carrier in dB. If $$P_{EN\text{-}DC,tot\_L} \leq \check{P}_{MCG} + T_{HIGH}(\check{P}_{MCG}),$$

then the NR carrier may be dropped. Otherwise, define $$P_{CMAX\_L,NR\_DPS} = \min(10*\log 10(10^{\wedge}(P_{EN\text{-}DC,tot\_L}/10) - 10^{\wedge}((\check{P}_{MCG} + T_{HIGH}(\check{P}_{MCG}))/10)), PCMAX\_L,NR),$$

where $T_{HIGH}(\check{P}_{MCG})$ is the E-UTRA power upper tolerance for the configured power in TS 36.101, $\check{P}_{MCG}$ is less than or equal to $P_{cmax\_E\text{-}UTRA}$, and we only consider the case that condition 'a' is TRUE as otherwise no change is needed. Also, $P_{EN\text{-}DC,tot\_L}$ is used because $P_{Total}^{EN\text{-}DC}$ is a variable that is internal to the UE. Since the UE knows its configured LTE power $\check{P}_{MCG}$, it also knows its allowed tolerance and can use this when setting $P_{CMAX\_L,NR\_DPS}$. When testing dynamic power sharing, the test equipment configures $\check{P}_{MCG}$ for the LTE carrier and then gives power 'up' commands to the NR carrier until reaches the steady state. Since both the UE and the test equipment know the configured power $\check{P}_{MCG}$, the upper tolerance $T_{HIGH}(\check{P}_{MCG})$ is also known to both. The maximum NR power is then required to exceed the value $$P_{CMAX\_L,NR\_DPS} - T_{LOW}(P_{CMAX\_L,NR\_DPS}),$$

where $T_{LOW}(P_{CMAX\_L,NR\_DPS})$ is the NR power lower tolerance from TS 38.101-1. In accordance with at least one embodiment, for intra-band EN-DC when condition 'a' is TRUE, let $\check{P}_{MCG}$ denote the configured power for the LTE carrier in dB. If $$P_{EN\text{-}DC,tot\_L} \leq \check{P}_{MCG} + T_{HIGH}(\check{P}_{MCG}),$$

then the NR carrier may be dropped. Otherwise, define $$P_{CMAX\_L,NR\_DPS} = \min(10*\log 10(10^{\wedge}(P_{EN\text{-}DC,tot\_L}/10) - 10^{\wedge}((\check{P}_{MCG} + T_{HIGH}(P_{MCG}))/10)), P_{CMAX\_L,NR}),$$

where $T_{HIGH}(\check{P}_{MCG})$ is the E-UTRA power upper tolerance for the configured power in TS 36.101. The maximum NR power is required to exceed the value $$P_{CMAX\_L,NR\_DPS} - T_{LOW}(P_{CMAX\_L,NR\_DPS}),$$

where $T_{LOW}(P_{CMAX\_L,NR\_DPS})$ is the NR power lower tolerance from TS 38.101-1.

Figure 6:
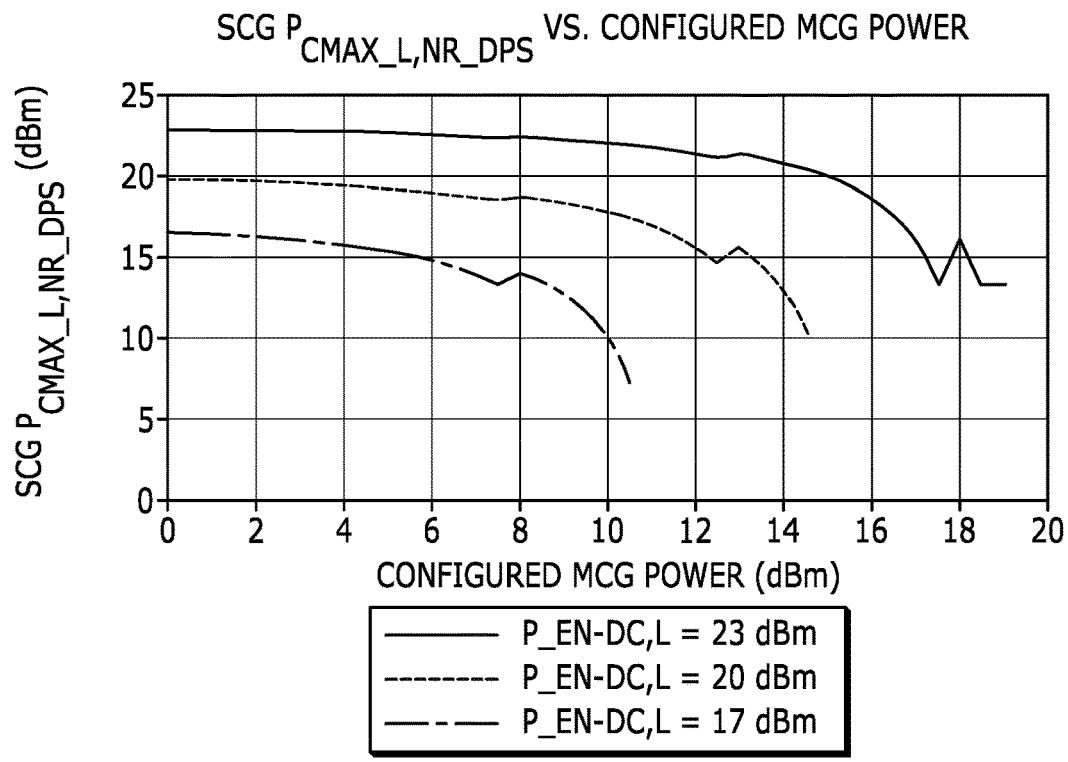
FIG. 6 is a graph, which illustrates an intra-band lower bound of a configured maximum output power for the NR carrier as a function of the configured LTE power.

FIG. 6 is a graph 600, which illustrates an intra-band lower bound of a configured maximum output power for the NR carrier as a function of the configured LTE power.

Inter-Band EN-DC

The situation is slightly different since for inter-band EN-DC $P_{EN\text{-}DC,tot\_L}$ is not defined and the definition of $P_{Total}^{EN\text{-}DC}$ does not include the MPR/A-MPR needed to meet emissions constraints on the NR carrier. Thus, for inter-band EN-DC we propose the following.

For inter-band EN-DC when condition 'a' is TRUE, let $\check{P}_{MCG}$ denote the configured power for the LTE carrier in dB. If $$P_{Total}^{EN\text{-}DC} \leq \check{P}_{MCG} + T_{HIGH}(\check{P}_{MCG}),$$

then the NR carrier may be dropped. Otherwise, define $$P_{CMAX\_L,NR\_DPS} = \min(10*\log 10(10^{\wedge}(P_{Total}^{EN\text{-}DC}/10) - 10^{\wedge}((\check{P}_{MCG} + T_{HIGH}(\check{P}_{MCG}))/10)), P_{CMAX\_L,NR}),$$

where $P_{CMAX\_L,NR}$ is from 6.2B.4.1.3 of TS 38.101-3, $T_{HIGH}(\check{P}_{MCG})$ is the E-UTRA power upper tolerance for the configured power from TS 36.101, $\check{P}_{MCG}$ is less than or equal to $P_{cmax\_E\text{-}UTRA}$, and we only consider the case that condition 'a' is TRUE as otherwise no change is needed. As in the intra-band case, since the UE knows its configured LTE power $\check{P}_{MCG}$, it also knows its allowed tolerance and can use this when setting $P_{CMAX\_L,NR\_DPS}$. When testing dynamic power sharing, the test equipment configures $\check{P}_{MCG}$ for the LTE carrier and then gives power 'up' commands to the NR carrier until the NR power reaches steady state. Since both the UE and the test equipment know the configured power $\check{P}_{MCG}$, the upper tolerance $T_{HIGH}(\check{P}_{MCG})$ is also known to both. The maximum NR power is then required to exceed the value $$P_{CMAX\_L,NR\_DPS} - T_{LOW}(P_{CMAX\_L,NR\_DPS}),$$

where $T_{LOW}(P_{CMAX\_L,NR\_DPS})$ is the NR power lower tolerance from TS 38.101-1.

Figure 7:
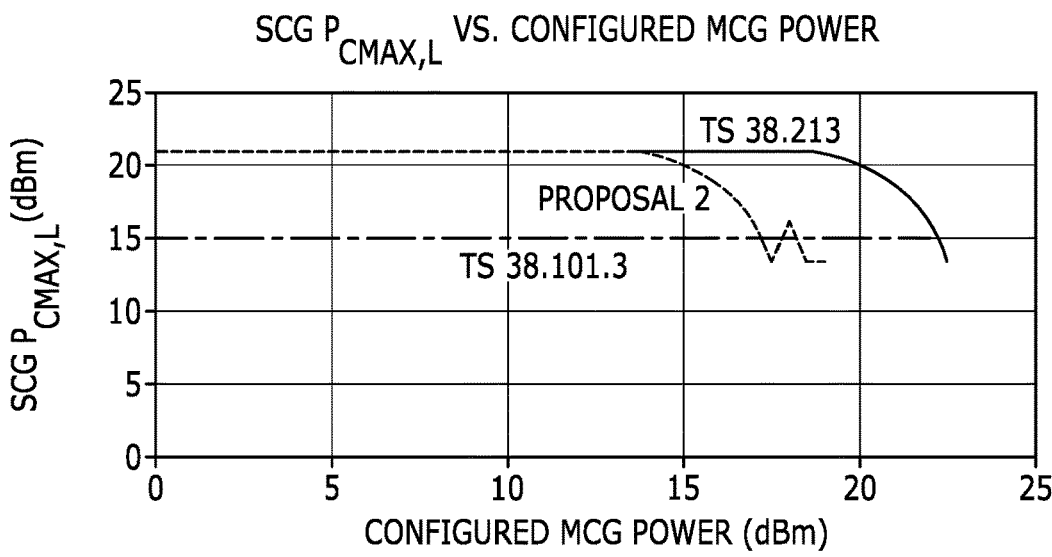
FIG. 7 is a graph, which illustrates an inter-band lower bound of a configured maximum output power for the NR carrier as a function of the configured LTE power, when the maximum power reduction for the NR carrier is 2 dB.

The proposed requirement on $P_{CMAX\_L,NR\_DPS}$ is shown in FIG. 7 for an example in which the MPR for the NR carrier is 2 dB, so that $P_{CMAX\_L,NR}=21$ dB. Also shown in FIG. 7 is the existing requirement from TS 38.101-3 as well as the TS 38.213 requirement (both from FIG. 4). It is very interesting to note that because tolerances are included as in this embodiment, $P_{CMAX\_L,NR\_DPS}$ may actually drop below the existing TS 38.101-3 requirement when the MCG power is above 17 dBm. If tolerance is not a concern in this region, then the UE can use the maximum of the TS 38.101-3 requirement and $P_{CMAX\_L,NR\_DPS}$.

FIG. 7 is a graph 700, which illustrates an inter-band lower bound of a configured maximum output power for the NR carrier as a function of the configured LTE power, when the maximum power reduction for the NR carrier is 2 dB.

In accordance with at least a further embodiment, for inter-band EN-DC when condition 'a' is TRUE, let $\check{P}_{MCG}$ denote the configured power for the LTE carrier in dB. If $$P_{Total}^{EN-DC} \leq \check{P}_{MCG} + T_{HIGH}(\check{P}_{MCG}),$$

then the NR carrier may be dropped. Otherwise, define $$P_{CMAX\_L,NR\_DPS} = \min(10*\log_{10}(10^\wedge(P_{Total}^{EN-DC}/10) - 10^\wedge((\check{P}_{MCG}+T_{HIGH}(\check{P}_{MCG}))/10)), P_{CMAX\_L,NR}),$$

where $P_{CMAX\_L,NR}$ is from 6.2B.4.1.3 of TS 38.101-3 and $T_{HIGH}(\check{P}_{MCG})$ is the E-UTRA power upper tolerance for the configured power from TS 36.101. The maximum NR power is required to exceed the value $$P_{CMAX\_L,NR\_DPS} - T_{LOW}(P_{CMAX\_L,NR\_DPS}),$$

where $T_{LOW}(P_{CMAX\_L,NR\_DPS})$ is the NR power lower tolerance from TS 38.101-1.

Verification of dynamic power sharing is needed to ensure that UE's behave as intended from TS 38.213 and so that the bad behavior illustrated above does not occur. From the operator's perspective, the behavior of the UE must be predictable, and currently there is too much uncertainty in the UE implementation. For this reason proposals have been made for defining requirements which do not allow the UE to drop or scale the NR carrier whenever condition 'a' is TRUE if neither dropping nor scaling are needed to meet either emissions or total power constraints. As a result, we have the following examples of proposals in accordance with at least some embodiments for intra-band and inter-band EN-DC, respectively.

In accordance with at least one embodiment, for intra-band EN-DC when condition 'a' is TRUE, let $\check{P}_{MCG}$ denote the configured power for the LTE carrier in dB. If $$P_{EN-DC,tot\_L} \leq \check{P}_{MCG} + T_{HIGH}(\check{P}_{MCG}),$$

then the NR carrier may be dropped. Otherwise, define $$P_{CMAX\_L,NR\_DPS} = \min(10*\log_{10}(10^\wedge(P_{EN-DC,tot\_L}/10) - 10^\wedge((\check{P}_{MCG}+T_{HIGH}(\check{P}_{MCG}))/10)), P_{CMAX\_L,NR},$$

where $T_{HIGH}(\check{P}_{MCG})$ is the E-UTRA power upper tolerance for the configured power in TS 36.101. The maximum NR power is required to exceed the value $$P_{CMAX\_L,NR\_DPS} - T_{LOW}(P_{CMAX\_L,NR\_DPS}),$$

where $T_{LOW}(P_{CMAX\_L,NR\_DPS})$ is the NR power lower tolerance from TS 38.101-1.

In accordance with at least a further embodiment, for inter-band EN-DC when condition 'a' is TRUE, let $\check{P}_{MCG}$ denote the configured power for the LTE carrier in dB. If $$P_{Total}^{EN-DC} \leq \check{P}_{MCG} + T_{HIGH}(\check{P}_{MCG}),$$

then the NR carrier may be dropped. Otherwise, define $$P_{CMAX\_L,NR\_DPS} = \min(10*\log_{10}(10^\wedge(P_{Total}^{EN-DC}/10) - 10^\wedge((\check{P}_{MCG}+T_{HIGH}(\check{P}_{MCG}))/10)), P_{CMAX\_L,NR}),$$

where $P_{CMAX\_L,NR}$ is from 6.2B.4.1.3 of TS 38.101-3 and $T_{HIGH}(\check{P}_{MCG})$ is the E-UTRA power upper tolerance for the configured power from TS 36.101. The maximum NR power is required to exceed the value $$P_{CMAX\_L,NR\_DPS} - T_{LOW}(P_{CMAX\_L,NR\_DPS}),$$

where $T_{LOW}(P_{CMAX\_L,NR\_DPS})$ is the NR power lower tolerance from TS 38.101-1.

It should be noted that the above embodiments can be modified to incorporate an estimate of the MCG power based on the UE's reported headroom for the LTE carrier. In particular, the transmitted MCG power can be determined from a power headroom report for the LTE carrier that includes configured Pcmax. With both configured Pcmax and the power headroom, $P_{MCG}$ can be estimated as $$P_{CMAX\,E\text{-}UTRA,c}(P) - PHR_{E\text{-}UTRA}$$

In accordance with at least some embodiments below, $P_{CMAX\,E\text{-}UTRA,c}(p) - PHR_{E\text{-}UTRA}$ can be used as the configured power in place of $\check{P}_{MCG}$ to determine $P_{CMAX\_L,NR\_DPS}$.

More specifically in accordance with at least one embodiment, for intra-band EN-DC when condition 'a' is TRUE, let $\check{P}_{MCG}$ denote the configured power for the LTE carrier in dB. If $$P_{EN-DC,tot\_L} \leq \check{P}_{MCG} + T_{HIGH}(\check{P}_{MCG}),$$

then the NR carrier may be dropped. Otherwise, define $$P_{CMAX\_L,NR\_DPS} = \min(10*\log_{10}(10^\wedge(P_{EN-DC,tot\_L}/10) - 10^\wedge(\check{P}_{MCG}+T_{HIGH}(\check{P}_{MCG}))/10)), P_{CMAX\_L,NR}),$$

where $T_{HIGH}(\check{P}_{MCG})$ is the E-UTRA power upper tolerance for the configured power in TS 36.101. The maximum NR power is required to exceed the value $$P_{CMAX\_L,NR\_DPS} - T_{LOW}(P_{CMAX\_L,NR\_DPS}),$$

where $T_{LOW}(P_{CMAX\_L,NR\_DPS})$ is the NR power lower tolerance from TS 38.101-1.

In accordance with at least a further embodiment, for inter-band EN-DC when condition 'a' is TRUE, let $\check{P}_{MCG}$ denote the configured power for the LTE carrier in dB. If $$P_{Total}^{EN-DC} \leq \check{P}_{MCG} + T_{HIGH}(\check{P}_{MCG}),$$

then the NR carrier may be dropped. Otherwise, define $$P_{CMAX\_L,NR\_DPS} = \min(10*\log_{10}(10^\wedge(P_{Total}^{EN-DC}/10) - 10^\wedge((\check{P}_{MCG}+T_{HIGH}(\check{P}_{MCG}))/10)), P_{CMAX\_L,NR}),$$

where $P_{CMAX\_L,NR}$ is from 6.2B.4.1.3 of TS 38.101-3 and $T_{HIGH}(\check{P}_{MCG})$ is the E-UTRA power upper tolerance for the configured power from TS 36.101. The maximum NR power is required to exceed the value $$P_{CMAX\_L,NR\_DPS} - T_{LOW}(P_{CMAX\_L,NR\_DPS}),$$

where $T_{LOW}(P_{CMAX\_L,NR\_DPS})$ is the NR power lower tolerance from TS 38.101-1.

The present disclosure attempts to identify how to define requirements for EN-DC dynamic power sharing. Currently, dynamic power sharing UE's are only required to prioritize LTE, but there is no requirement that unused LTE power be made available to the NR carrier. As noted above a significant problem with prior systems can include that the UE does not know precisely how much power is transmitted on the LTE carrier and so does not know how much power remains for the NR carrier.

Prior solutions have been proposed, but so far none have been accepted. An issue that has not been resolved is how to deal with the tolerances for the configured power.

Correspondingly in accordance with at least some embodiments of the present application, For EN-DC, it may be desirable to define new Pcmax,L on the NR carrier for testing purposes that takes into account the tolerances on the configured power of the LTE carrier.

Figure 8:
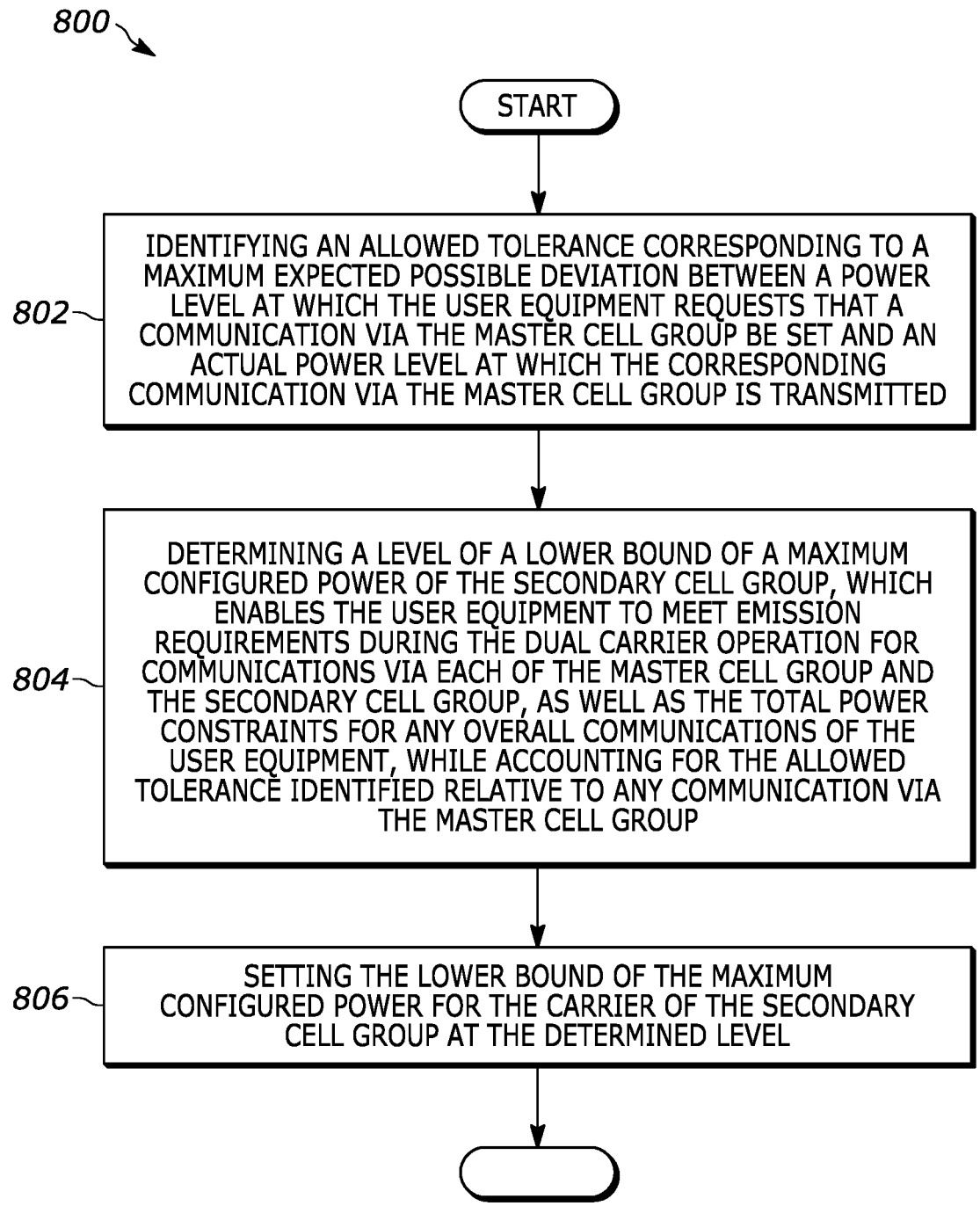
FIG. 8 is a flow diagram in a user equipment for managing use of dynamic power sharing for dual carrier operation, including a determined level of a lower bound of a maximum configured power of the secondary cell group, which accounts for an identified allowed tolerance in master cell group transmission.

FIG. 8 illustrates a flow diagram 800 in a user equipment for managing use of dynamic power sharing for dual carrier operation, including a determined level of a lower bound of a maximum configured power of the secondary cell group, which accounts for an identified allowed power tolerance in master cell group transmission. In accordance with at least one embodiment, the method can include identifying 802 an allowed tolerance corresponding to a maximum expected possible deviation between a power level at which the user equipment requests that a communication via the master cell group be set and an actual power level at which the corresponding communication via the master cell group is transmitted. A level of a lower bound of a maximum configured power of the secondary cell group can be determined 804, which enables the user equipment to meet emission requirements during the dual carrier operation for communications via each of the master cell group and the secondary cell group, as well as the total power constraints for any overall communications of the user equipment, while accounting for the allowed tolerance identified relative to any communication via the master cell group. The lower bound of the maximum configured power for the carrier of the secondary cell group can be set 806 at the determined level.

In some instances, the master cell group and the secondary cell group associated with the dual connectivity mode can include an operation in accordance with multiple cellular standards. In some of these instances, the multiple cellular standards can include evolved universal terrestrial radio access (E-UTRA)/long term evolution (LTE), and new radio (NR). In some of these instances, the master cell group can be associated with the evolved universal terrestrial radio access/long term evolution cellular standard, and the secondary cell group can be associated with the new radio cellular standard.

In some instances, the user equipment can be configured for intra-band dual carrier operation. In some of these instances, the intra-band dual carrier operation can include intra-band E-UTRA-NR dual carrier including an LTE carrier and an NR carrier, and when a condition $10 \log_{10} [p_{CMAX\_E-UTRA,c}(p) + p_{CMAX,f,c,NR}(q)] > P_{EN-DC,tot\_L}$ is TRUE, $\tilde{P}_{MCG}$ can denote a configured power for the LTE carrier in dB and $P_{CMAX\_L,NR\_DPS} = \min(10*\log 10(10^{\wedge}(P_{EN-DC,tot\_L}/10) - 10^{\wedge}((\tilde{P}_{MCG} + T_{HIGH}(\tilde{P}_{MCG}))/10)), P_{CMAX\_L,NR})$ where $T_{HIGH}(\tilde{P}_{MCG})$ is an allowed upper tolerance for the configured power for the LTE carrier, and a maximum NR power must equal or exceed a value $P_{CMAX\_L,NR\_DPS} - T_{LOW}(P_{CMAX\_L,NR\_DPS})$ where $T_{LOW}(P_{CMAX\_L,NR\_DPS})$ Is an allowed lower tolerance for a configured power for the NR carrier.

In some instances, the user equipment can be configured for inter-band dual carrier operation. In some of these instances, the inter-band dual carrier operation can include inter-band E-UTRA-NR dual carrier including an LTE carrier and an NR carrier, and when a condition $10 \log_{10} [p_{CMAX\_E-UTRA,c}(p) + p_{CMAX,f,c,NR}(q)] > P_{EN-DC,tot\_L}$ is TRUE, $\tilde{P}_{MCG}$ can denotes a configured power for the LTE carrier in dB and $P_{CMAX\_L,NR\_DPS} = \min(10*\log 10(10^{\wedge}(P_{Total}^{EN-DC}/10) - 10^{\wedge}((\tilde{P}_{MCG} + T_{HIGH}(\tilde{P}_{MCG}))/10)), P_{CMAX\_L,NR})$, where $P_{CMAX\_L,NR}$ is a lower bound of a configured maximum output power, $T_{HIGH}(\tilde{P}_{MCG})$ is an allowed upper tolerance for the configured power for the LTE carrier, and $\tilde{P}_{MCG}$ is less than or equal to $P_{cmax\_E-UTRA}$. In some of these instances, $P_{CMAX\_L,NR} = \text{MIN}\{P_{EMAX, EN-DC}, (P_{PowerClass, EN-DC} - \Delta P_{PowerClass,EN-DC}), \text{MIN}(P_{EMAX}, P_{NR}) - \Delta T_{C\_NR}, (P_{PowerClass} - \Delta P_{PowerClass}) - \text{MAX}(\text{MPR} + \text{A-MPR} + \Delta T_{IB} + \Delta T_{C\_NR} + \Delta T_{RxSRS}, \text{P-MPR})\}$.

In some instances, the emission requirements can include one or more of spectral emissions mask requirements, adjacent channel leakage requirements, or spurious emissions requirements. In some of these instances, the spectral emissions mask requirement can include a requirement for a respective spectral emissions mask for each carrier that must be met, which is based upon a measurement of out of channel emissions not exceeding a predetermined set value. Further, the adjacent channel leakage requirements can include a requirement that a ratio of power that leaks into an adjacent channel relative to power in a desired channel not exceed a predetermined set value. Still further, the spurious emissions requirements can include a requirement that an amount of power that leaks into a spectrum farther than the adjacent channel not exceed a predetermined set value.

In some instances, the method can further comprise verifying that dynamic power sharing for dual carrier operation is supported, where power from the maximum configured power that is not used in support of a communication via the master cell group is made available to support a communication via the secondary cell group. In some of these instances, verifying that the dynamic power sharing for dual carrier operation is supported can include a qualitative requirement that the power measured for the communication associated with the secondary cell group increases, when the power measured for the communication associated with the master cell group decreases. In the same or other instances, verifying that the dynamic power sharing for dual carrier operation is supported can include a quantitative requirement that the power measured for the communication associated with the secondary cell group must exceed a lower bound of the maximum configured power of the secondary cell group after accounting for an amount of power measured from a communication via the master cell group, as well as the identified allowed tolerance corresponding to the maximum expected possible deviation.

Figure 9:
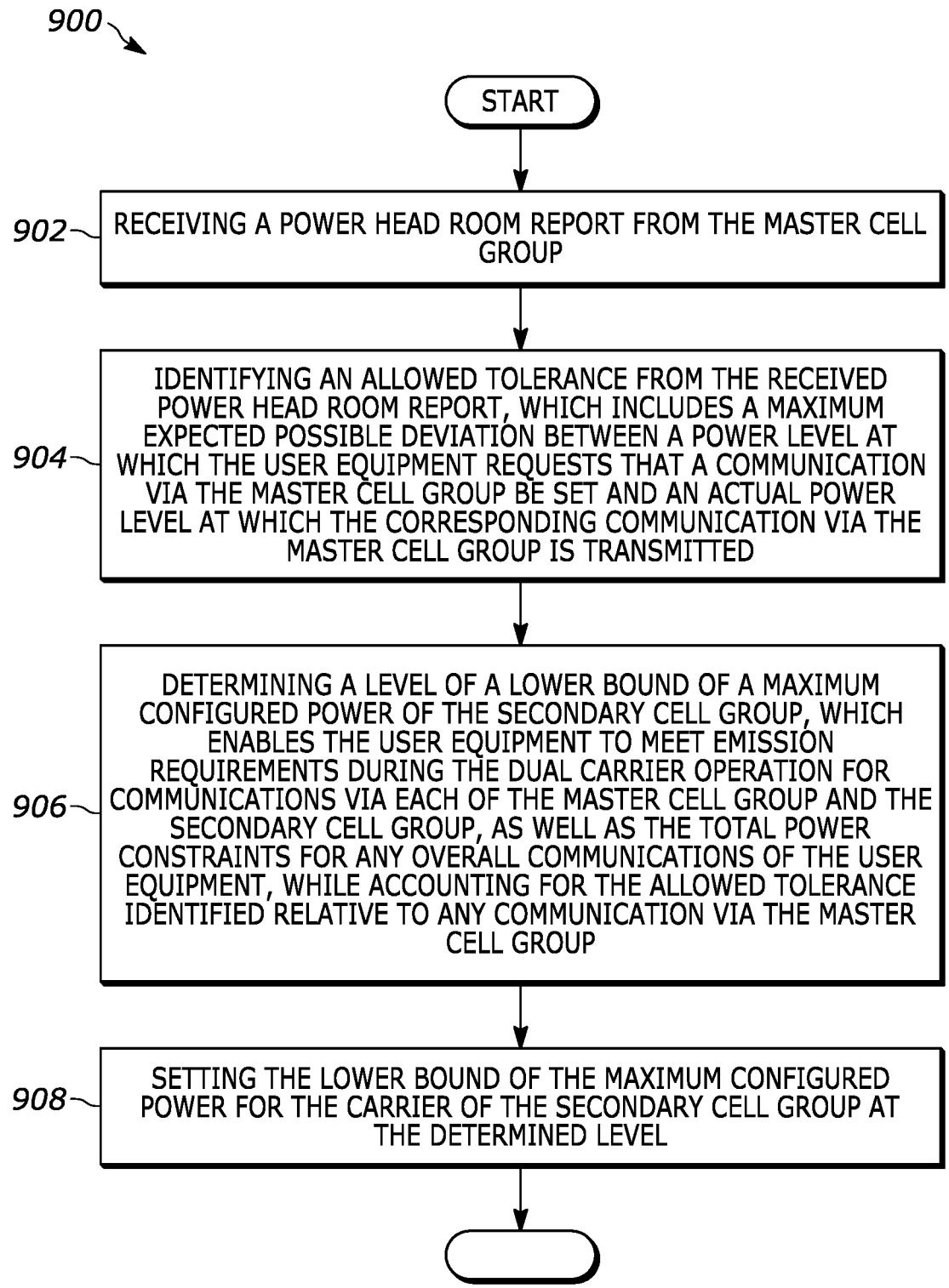
FIG. 9 is a flow diagram in a user equipment for managing use of dynamic power sharing for dual carrier operation, including a determined level of a lower bound of a maximum configured power of the secondary cell group, which accounts for an identified allowed tolerance from a power head room report.

FIG. 9 illustrates a flow diagram 900 in a user equipment for managing use of dynamic power sharing for dual carrier operation, including a determined level of a lower bound of a maximum configured power of the secondary cell group, which accounts for an identified allowed tolerance from a power head room report. In accordance with at least one embodiment, the method can include receiving 902 a power head room report from the master cell group. An allowed tolerance can be identified 904 from the received power head room report, which includes a maximum expected possible deviation between a power level at which the user equipment requests that a communication via the master cell group be set and an actual power level at which the corresponding communication via the master cell group is transmitted. A level of a lower bound of a maximum configured power of the secondary cell group can be determined 906, which enables the user equipment to meet emission requirements during the dual carrier operation for communications via each of the master cell group and the secondary cell group, as well as the total power constraints for any overall communications of the user equipment, while accounting for the allowed tolerance identified relative to any communication via the master cell group. The lower bound of the maximum configured power for the carrier of the secondary cell group can be set 908 at the determined level.

In some instances, the master cell group and the secondary cell group associated with the dual connectivity mode can include an operation in accordance with multiple cellular standards. In some of these instances, the multiple cellular standards can include evolved universal terrestrial radio access (E-UTRA)/long term evolution (LTE), and new radio (NR). In some of these instances, the master cell group can be associated with the evolved universal terrestrial radio access/long term evolution cellular standard, and the secondary cell group can be associated with the new radio cellular standard.

In some instances, the user equipment can be configured for intra-band dual carrier operation. In some of these instances, the intra-band dual carrier operation can include intra-band E-UTRA-NR dual carrier including an LTE carrier and an NR carrier, and when a condition $10 \log_{10} [p_{CMAX\_E-UTRA,c}(p)+p_{CMAX,f,c,NR}(q)] > P_{EN-DC,tot\_L}$ is TRUE, $\breve{P}_{MCG}$ can denote a configured power for the LTE carrier in dB and wherein when $P_{EN-DC,tot\_L} \leq \breve{P}_{MCG} + T_{HIGH}(\breve{P}_{MCG})$, then the NR carrier may be dropped, otherwise, defining $P_{CMAX\_L,NR\_DPS} = \min(10*\log\ 10(10^{\wedge}(P_{EN-DC,tot\_L}/10) - 10^{\wedge}((\breve{P}_{MCG}+T_{HIGH}(\breve{P}_{MCG}))/10)),\ P_{CMAX\_L,NR})$, where $T_{HIGH}(\breve{P}_{MCG})$ is an allowed upper tolerance for the configured power for the LTE carrier, and a maximum NR power must equal or exceed a value $P_{CMAX\_L,NR\_DPS} - T_{LOW}(P_{CMAX\_L,NR\_DPS})$ where $T_{LOW}(P_{CMAX\_L,NR\_DPS})$ is an allowed lower tolerance for a configured power for the NR carrier.

In some instances, the user equipment can be configured for inter-band dual carrier operation. In some of these instances, the inter-band dual carrier operation can include inter-band E-UTRA-NR dual carrier including an LTE carrier and an NR carrier, and when a condition $10 \log_{10} [p_{CMAX\_E-UTRA,c}(p)+p_{CMAX,f,c,NR}(q)] > P_{EN-DC,tot\_L}$ is TRUE, $\breve{P}_{MCG}$ can denote a configured power for the LTE carrier in dB and wherein when $P_{Total}^{EN-DC} \leq \breve{P}_{MCG} + T_{HIGH}(\breve{P}_{MCG})$, then the NR carrier may be dropped, otherwise, defining $P_{CMAX\_L,NR\_DPS} = \min(10*\log\ 10(10^{\wedge}(P_{EN-DC,tot\_L}/10) - 10^{\wedge}((\breve{P}_{MCG}+T_{HIGH}(\breve{P}_{MCG}))/10)),\ P_{CMAX\_L,NR})$, where $P_{CMAX\_L,NR}$ is a lower bound of a configured maximum output power, $T_{HIGH}(\breve{P}_{MCG})$ is an allowed upper tolerance for the configured power for the LTE carrier, and a maximum NR power must exceed the value $P_{CMAX\_L,NR\_DPS} - T_{LOW}(P_{CMAX\_L,NR\_DPS})$, where $T_{LOW}(P_{CMAX\_L,NR\_DPS})$ is an allowed lower tolerance for a configured power for the NR carrier.

In some instances, the emission requirements can include one or more of spectral emissions mask requirements, adjacent channel leakage requirements, or spurious emissions requirements. In some of these instances, the spectral emissions mask requirement can include a requirement for a respective spectral emissions mask for each carrier that must be met, which is based upon a measurement of out of channel emissions not exceeding a predetermined set value. Further, the adjacent channel leakage requirements can include a requirement that a ratio of power that leaks into an adjacent channel relative to power in a desired channel not exceed a predetermined set value. Still further, the spurious emissions requirements can include a requirement that an amount of power that leaks into a spectrum farther than the adjacent channel not exceed a predetermined set value.

In some instances, the method can further comprise verifying that dynamic power sharing for dual carrier operation is supported, where power from the maximum configured power that is not used in support of a communication via the master cell group is made available to support a communication via the secondary cell group. In some of these instances, verifying that the dynamic power sharing for dual carrier operation is supported can include a qualitative requirement that the power measured for the communication associated with the secondary cell group increases, when the power measured for the communication associated with the master cell group decreases. In the same or other instances, verifying that the dynamic power sharing for dual carrier operation is supported can include a quantitative requirement that the power measured for the communication associated with the secondary cell group must exceed a lower bound of the maximum configured power of the secondary cell group after accounting for an amount of power measured from a communication via the master cell group, as well as the identified allowed tolerance corresponding to the maximum expected possible deviation.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, or other network entity, can perform reciprocal operations of a UE. For example, the network entity can transmit signals received by the UE and can receive signals transmitted by the UE. The network entity can also process and operate on sent and received signals.

Figure 10:
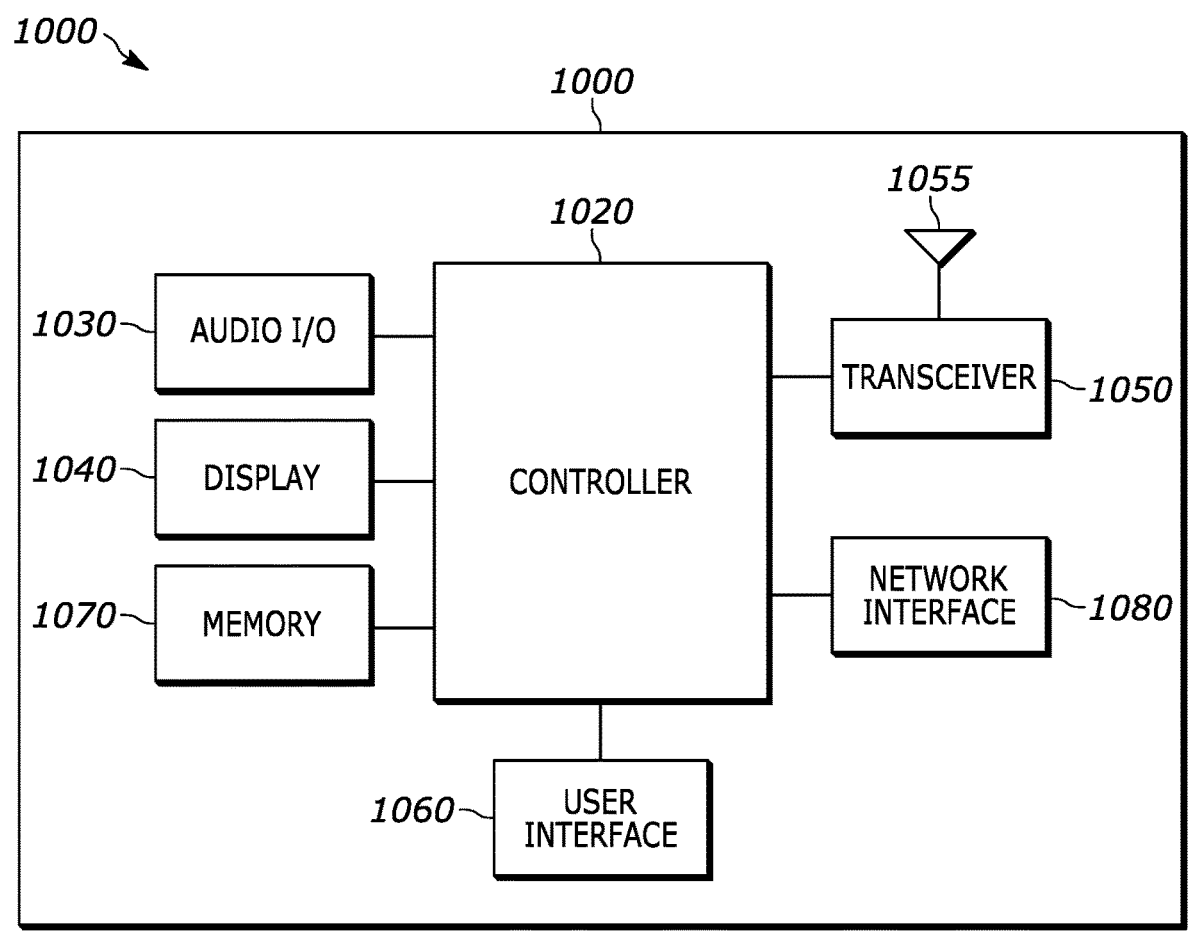
FIG. 10 is an example block diagram of an apparatus according to a possible embodiment.

FIG. 10 is an example block diagram of an apparatus 1000, such as the wireless communication device 110, according to a possible embodiment. The apparatus 1000 can include a housing 1010, a controller 1020 within the housing 1010, audio input and output circuitry 1030 coupled to the controller 1020, a display 1040 coupled to the controller 1020, a transceiver 1050 coupled to the controller 1020, an antenna 1055 coupled to the transceiver 1050, a user interface 1060 coupled to the controller 1020, a memory 1070 coupled to the controller 1020, and a network interface 1080 coupled to the controller 1020. The apparatus 1000 can perform the methods described in all the embodiments The display 1040 can be a viewfinder, a liquid crystal display (LCD), a light emitting diode (LED) display, a plasma display, a projection display, a touch screen, or any other device that displays information. The transceiver 1050 can include a transmitter and/or a receiver. The audio input and output circuitry 1030 can include a microphone, a speaker, a transducer, or any other audio input and output circuitry. The user interface 1060 can include a keypad, a keyboard, buttons, a touch pad, a joystick, a touch screen display, another additional display, or any other device useful for providing an interface between a user and an electronic device. The network interface 1080 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1070 can include a random access memory, a read only memory, an optical memory, a solid state memory, a flash memory, a removable memory, a hard drive, a cache, or any other memory that can be coupled to an apparatus.

The apparatus 1000 or the controller 1020 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a NET® framework, or any other application framework. The software and/or the operating system may be stored in the memory 1070 or elsewhere on the apparatus 1000. The apparatus 1000 or the controller 1020 may also use hardware to implement disclosed operations. For example, the controller 1020 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1020 may be any controller or processor device or devices capable of operating an apparatus and implementing the disclosed embodiments. Some or all of the additional elements of the apparatus 1000 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment for managing use of dynamic power sharing for dual carrier operation, which includes respective communications via a master cell group and a secondary cell group, the method comprising:
   receiving a power head room report from the master cell group;
   identifying an allowed tolerance from the received power head room report, which includes a maximum expected possible deviation between a power level at which the user equipment requests that a communication via the master cell group be set and an actual power level at which the corresponding communication via the master cell group is transmitted;
   determining a level of a lower bound of a maximum configured power of the secondary cell group, which enables the user equipment to meet emission requirements during the dual carrier operation for communications via each of the master cell group and the secondary cell group, as well as the total power constraints for any overall communications of the user equipment, while accounting for the allowed tolerance identified relative to any communication via the master cell group; and
   setting the lower bound of the maximum configured power for the carrier of the secondary cell group at the determined level.

2. The method in accordance with claim 1, wherein the master cell group and the secondary cell group associated with the dual connectivity mode includes an operation in accordance with multiple cellular standards.

3. The method in accordance with claim 2, wherein the multiple cellular standards include evolved universal terrestrial radio access (E-UTRA)/long term evolution (LTE), and new radio (NR).

4. The method in accordance with claim 3, wherein the master cell group is associated with the evolved universal terrestrial radio access/long term evolution cellular standard, and the secondary cell group is associated with the new radio cellular standard.

5. The method in accordance with claim 1, wherein the user equipment is configured for intra-band dual carrier operation.

6. The method in accordance with claim 5, wherein the intra-band dual carrier operation includes intra-band E-UTRA-NR dual carrier including an LTE carrier and an NR carrier, and when a condition $10 \log_{10} [p_{CMAX\_E-UTRA,c}(p)+p_{CMAX,f,c,NR}(q)]P_{EN-DC,tot\_L}$ is TRUE, $\breve{P}_{MCG}$ denotes a configured power for the LTE carrier in dB and wherein when $P_{EN-DC,tot\_L} \leq \breve{P}_{MCG}+T_{HIGH}(\breve{P}_{MCG})$, then the NR carrier may be dropped, otherwise, defining $P_{CMAX\_L,NR\_DPS}=\min(10*\log 10(10\hat{}(P_{EN-DC,tot\_L}/10)-10\hat{}((\breve{P}_{MCG}+T_{HIGH}$ ($\check{P}_{MCG}$))/10)), $P_{CMAX\_L,NR}$), where $T_{HIGH}(\check{P}_{MCG})$) is an allowed upper tolerance for the configured power for the LTE carrier, and a maximum NR power must equal or exceed a value $P_{CMAX\_L,NR\_DPS}-T_{LOW}(P_{CMAX\_L,NR\_DPS})$ where $T_{LOW}(P_{CMAX\_L,NR\_DPS})$ is an allowed lower tolerance for a configured power for the NR carrier.

7. The method in accordance with claim 1, wherein the user equipment is configured for inter-band dual carrier operation.

8. The method in accordance with claim 7, wherein the inter-band dual carrier operation includes inter-band E-UTRA-NR dual carrier including an LTE carrier and an NR carrier, and when a condition $10 \log_{10} [p_{CMAX\_E-UTRA,c}(p)+p_{CMAX,f,c,NR}(q)] > P_{EN-DC,tot\_L}$ is TRUE, $\check{P}_{MCG}$ denotes a configured power for the LTE carrier in dB and wherein when $P_{Total}^{EN-DC} \geq \check{P}_{MCG}+T_{HIGH}(\check{P}_{MCG})$, then the NR carrier may be dropped, otherwise, defining $P_{CMAX\_L,NR\_DPS}$=min $(10*\log 10(10^\wedge(P_{Total}^{EN-DC}/10)-10^\wedge((\check{P}_{MCG}+T_{HIGH}(\check{P}_{MCG}))/10))$, $P_{CMAX\_L,NR}$), where $P_{CMAX\_L,NR}$ is a lower bound of a configured maximum output power, $T_{HIGH}(\check{P}_{MCG})$ is an allowed upper tolerance for the configured power for the LTE carrier, and a maximum NR power must exceed the value $P_{CMAX\_L,NR\_DPS}-T_{LOW}(P_{CMAX\_L,NR\_DPS})$, where $T_{LOW}(P_{CMAX\_L,NR\_DPS})$ is an allowed lower tolerance for a configured power for the NR carrier.

9. The method in accordance with claim 1, wherein the emission requirements include one or more of spectral emissions mask requirements, adjacent channel leakage requirements, or spurious emissions requirements.

10. The method in accordance with claim 9, wherein the spectral emissions mask requirement includes a requirement for a respective spectral emissions mask for each carrier that must be met, which is based upon a measurement of out of channel emissions not exceeding a set absolute value.

11. The method in accordance with claim 9, wherein the adjacent channel leakage requirements include a requirement that a ratio of power that leaks into an adjacent channel relative to power in a desired channel not exceed a predetermined set value.

12. The method in accordance with claim 9, wherein the spurious emissions requirements includes a requirement that an amount of power that leaks into a spectrum farther than the adjacent channel not exceed a predetermined set value.

13. The method in accordance with claim 1, further comprising verifying that dynamic power sharing for dual carrier operation is supported, where power from the maximum configured power that is not used in support of a communication via the master cell group is made available to support a communication via the secondary cell group.

14. The method in accordance with claim 13, wherein verifying that the dynamic power sharing for dual carrier operation is supported includes a qualitative requirement that the power measured for the communication associated with the secondary cell group increases, when the power measured for the communication associated with the master cell group decreases.

15. The method in accordance with claim 13, wherein verifying that the dynamic power sharing for dual carrier operation is supported includes a quantitative requirement that the power measured for the communication associated with the secondary cell group must exceed a a lower bound of the maximum configured power of the secondary cell group after accounting for an amount of power measured from a communication via the master cell group, as well as the identified allowed tolerance corresponding to the maximum expected possible deviation.

16. A user equipment for managing use of dynamic power sharing for dual carrier operation, which includes respective communications via a master cell group and a secondary cell group, the user equipment comprising:
a transceiver that receives a power head room report from the master cell group; and
a controller, coupled to the transceiver, that identifies an allowed tolerance from the received power head room report, which includes a maximum expected possible deviation between a power level at which the user equipment requests that a communication via the master cell group be set and an actual power level at which the corresponding communication via the master cell group is transmitted;
wherein the controller further determines a level of a lower bound of a maximum configured power of the secondary cell group, which enables the user equipment to meet emission requirements during the dual carrier operation for communications via each of the master cell group and the secondary cell group, as well as the total power constraints for any overall communications of the user equipment, while accounting for the allowed tolerance identified relative to any communication via the master cell group; and
wherein the controller further sets the lower bound of the maximum configured power for the carrier of the secondary cell group at the determined level.

17. The user equipment in accordance with claim 16, wherein the master cell group and the secondary cell group associated with the dual connectivity mode includes an operation in accordance with multiple cellular standards.

18. The user equipment in accordance with claim 17, wherein the multiple cellular standards include evolved universal terrestrial radio access (E-UTRA)/long term evolution (LTE), and new radio (NR).

19. The user equipment in accordance with claim 18, wherein the master cell group is associated with the evolved universal terrestrial radio access/long term evolution cellular standard, and the secondary cell group is associated with the new radio cellular standard.

\* \* \* \* \*